W. H. THOMAS.
Cultivating Implement.
No. 199,481. Patented Jan. 22, 1878.
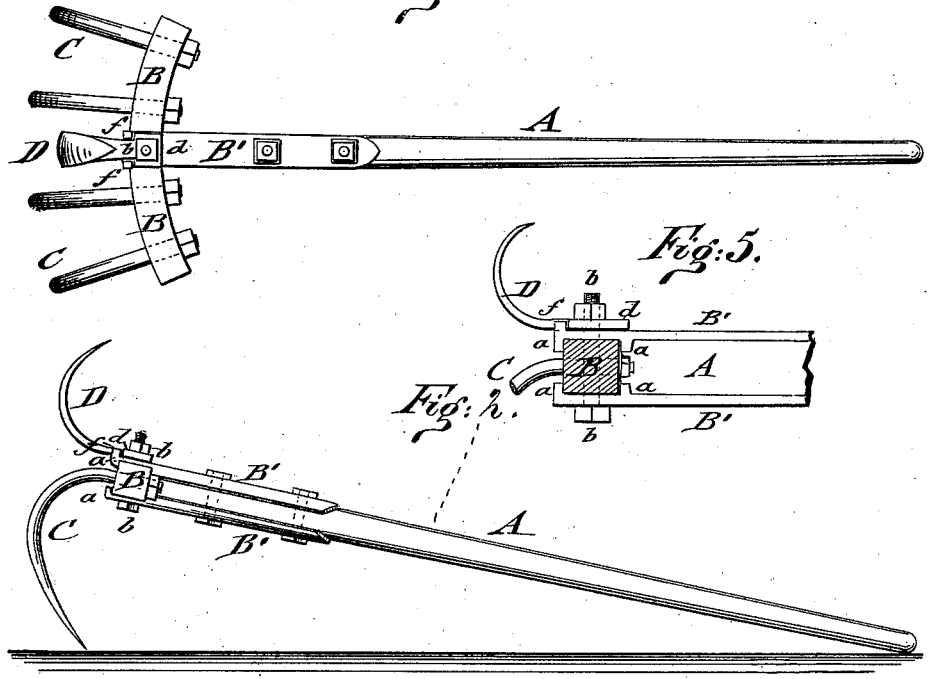
WITNESSES:
INVENTOR:
W. H. Thomas
BY Munn & Co
ATTORNEYS.

UNITED STATES PATENT OFFICE.

WILLIAM H. THOMAS, OF WAY CROSS, GEORGIA.

IMPROVEMENT IN CULTIVATING IMPLEMENTS.

Specification forming part of Letters Patent No. 199,481, dated January 22, 1878; application filed September 29, 1877.

*To all whom it may concern:*

Be it known that I, WILLIAM H. THOMAS, of Way Cross, in the county of Ware and State of Georgia, have invented a new and Improved Cultivating Implement, of which the following is a specification:

In the accompanying drawing, Figure 1 represents a top view of my improved cultivating implement; Fig. 2, a side view of the same. Figs. 3 and 4 are perspective views of a rake and hoe for being interchangeably attached to the implement; and Fig. 5 is a detail section through the head of the implement, showing attachment of cross-piece.

Similar letters of reference indicate corresponding parts.

The invention is intended to furnish an improved implement for garden use that combines the advantages of a common hoe, finger-hoe, driller, rake, &c., being of strong and solid construction, and readily adapted and used for any one of the purposes mentioned.

The invention will first be described in connection with the drawing, and then pointed out in the claim.

Referring to the drawing, A represents the handle of my improved cultivating implement for garden and farm use.

To the end of the handle is attached an arc-shaped solid cross-piece or head, B, to the square holes of which a number of curved cultivator-teeth, C, are rigidly bolted, so as to form a finger-hole. The cross-piece B is secured to the end of the handle by means of strap-irons B', which form shoulders $a$ at both sides of the cross-piece, so as to lock it rigidly in position when the strap-irons are bolted to the handle A and to the cross-piece. The screw-bolt $b$, that passes through the strap-irons and cross-piece, also serves to attach either a drilling-tooth, D, rake $D^1$, or common hoe, $D^2$, which are made at the end with a square and perforated part, $d$, that rests against lugs $f$ of the top strap B', the lugs $f$ bearing at both sides on the shank of the drilling-tooth, rake, or hoe, and holding the same firmly in position on the implement, admitting, by loosening the nut, the quick and convenient interchanging of the different implements, according to the purposes required. In this manner a combination implement of strong and solid construction, and of extended application, is furnished for garden and farm uses.

Having thus described my invention, I claim as new and desire to secure by Letters Patent—

The combination of handle A, strap-irons B', having shoulders $a$, the cross-bar B, and through-bolt $b$, the upper one of said strap-irons provided with lugs $ff$ for the attachment of drill-tooth D, all constructed and arranged to operate substantially as shown and described.

WILLIAM HOWARD THOMAS.

Witnesses:
W. B. FOLKS,
A. E. KING.